US007277394B2

(12) United States Patent
Hester et al.

(10) Patent No.: US 7,277,394 B2
(45) Date of Patent: Oct. 2, 2007

(54) NON INTERFERING GROUP BASED WIRELESS NETWORK PROTOCOLS

(75) Inventors: Lance E. Hester, Sunrise, FL (US); Chung-Chieh Lee, Long Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 574 days.

(21) Appl. No.: 10/435,921

(22) Filed: May 12, 2003

(65) Prior Publication Data
US 2004/0228300 A1 Nov. 18, 2004

(51) Int. Cl.
*H04L 12/26* (2006.01)
(52) U.S. Cl. .................. 370/238; 370/351; 370/338
(58) Field of Classification Search ........ 370/227–229, 370/237–238, 328, 338, 349, 351–359; 709/220–222, 709/241; 455/422, 432–433, 435, 456
See application file for complete search history.

(56) References Cited

U.S. PATENT DOCUMENTS

| 5,452,471 | A | * | 9/1995 | Leopold et al. ............. 455/429 |
| 5,652,751 | A | * | 7/1997 | Sharony ..................... 370/227 |
| 5,848,359 | A | * | 12/1998 | Furtaw ....................... 455/447 |
| 5,883,884 | A | * | 3/1999 | Atkinson .................... 370/279 |
| 6,108,311 | A | * | 8/2000 | Ramaswami et al. ....... 370/258 |
| 6,304,556 | B1 | * | 10/2001 | Haas .......................... 370/254 |
| 6,947,405 | B2 | * | 9/2005 | Pitcher et al. .............. 370/338 |
| 6,980,524 | B1 | * | 12/2005 | Lu et al. ..................... 370/254 |
| 2002/0159405 | A1 | * | 10/2002 | Garrison et al. ............ 370/328 |

* cited by examiner

*Primary Examiner*—Wing Chan
*Assistant Examiner*—Mark A. Mais

(57) ABSTRACT

A wireless network (100) and method (200) for assigning a set of channels to a set of wireless devices (102-126) in the network where there are less channels than devices such that wireless devices are grouped in channel groups such that the wireless devices assigned to each channel group are positioned so as not to interfere with each other. In assigning an nth wireless device to a kth channel group, the nth and preferably one member of the kth channel group at a time are instructed to transmit simultaneously in order to ascertain if the nth wireless device interferes with or is interfered with by any member of the kth channel group.

15 Claims, 3 Drawing Sheets

NON INTERFERING GROUP BASED WIRELESS NETWORK PROTOCOLS

FIELD OF THE INVENTION

The present invention relates in to wireless networks.

BACKGROUND OF THE INVENTION

Advances in electronics manufacturing technology have enabled the manufacture of inexpensive wireless devices in large quantities. Presently there is an interest in greatly expanding the use of wireless devices and networks of wireless devices beyond traditional communication uses.

A variety of new applications for networks including many low cost devices are contemplated. Such networks are generally expected to be what is termed Ad Hoc. In the context of wireless networks, Ad Hoc implies that when a number of devices are powered up, and at least some of the devices are in range of each other, the devices will interoperate to form a network. Ad Hoc networks can be formed without detailed planing by a network engineer. The placement of devices in an Ad Hoc network can be relatively random from the point of view of radio link considerations. The devices are placed as needed according to the use of the network. It may so happen that many devices are placed close together creating a potential for interference.

One category of application for networks that are to include many low cost devices is "Sensor Networks". Sensor networks are typically envisioned to include many wireless devices coupled to sensors, and one or a few wireless devices coupled to data sinks. The data traffic in sensor networks is primarily from the sensors to the data sinks. There may be some small amount of control signal traffic from the data sink to the sensors. Thus, in sensor networks the foremost issues relate to sending messages from the sensors to the data sink(s).

The bandwidth available for use by any wireless network is limited by regulatory constraints. As the number of wireless devices in a given locale increases, the limits of bandwidth become problematic insofar as a finite bandwidth must be shared by all the devices in the network. In traditional cellular networks, bandwidth reuse is achieved by dividing the area in which the cellular network is deployed into a number of cells, the size of which is on the order of the range of mobile wireless devices, and assigning specific sub-bands to specific cells in such a manner that adjacent cells use different sub bands. However, such a system requires strategic placement of a number of cell sites in order to achieve frequency reuse, and is therefore not ideal for use in Ad Hoc networks. A number of methods have been used to share available bandwidth in wireless communication systems. These include Frequency Division Multi-Access (FDMA), Code Division Multi-Access (CDMA), and Time Division Multi-Access (TDMA). One protocol for sharing bandwidth that is based on TDMA is known as polling Media Access Control (MAC). In polling MAC protocols, under the direction of a network controller wireless device, each other wireless device in the network is allocated a particular time slot in which to transmit messages. In such systems, the network controller sends a poll signal to each wireless device at a prescribed time to trigger the particular device to transmit any messages that need to be transmitted. Unfortunately, in networks using a traditional polling MAC, the bandwidth that is effectively available to each device is inversely related to the number of devices in the network.

It is generally desirable to increase the effective bandwidth available to devices in wireless networks. In particular, it is desirable to increase the bandwidth available in Ad Hoc sensor networks.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
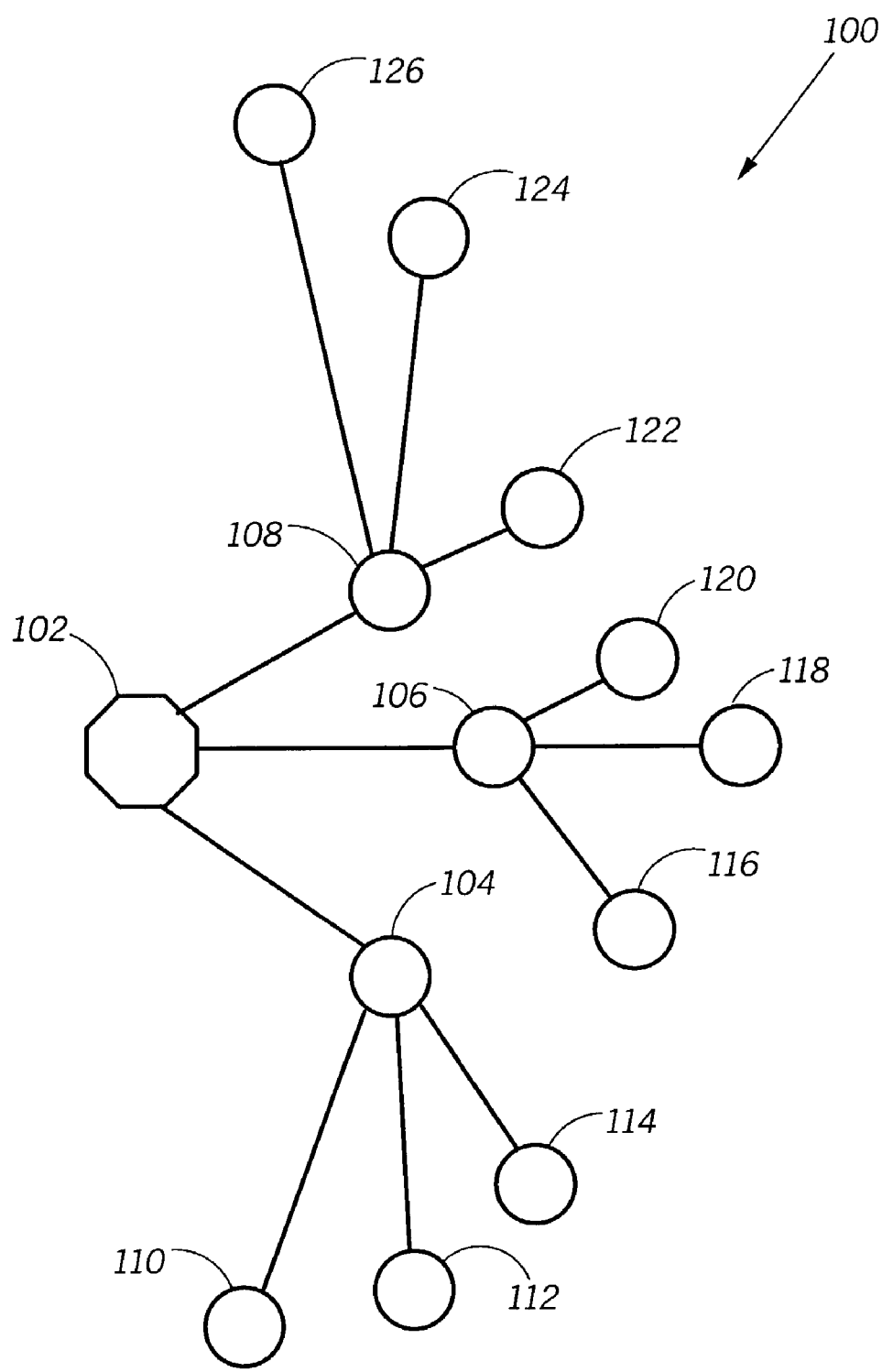
FIG. 1 is an example of a graph of a hierarchical tree topology routing network of wireless devices according to the preferred embodiment of the invention.

FIG. 1 is an example of graph of a hierarchical tree topology routing network 100 of wireless devices according to the preferred embodiment of the invention. The network 100 comprises a plurality of wireless devices 102-122, including a root position wireless device 102. The root position wireless device 102 has functionality that will be described below with reference to FIGS. 2-3 that includes assigning channels to other wireless devices 104-122 of the network 100, and preferably orchestrating the use of different channels by the other wireless devices 104-122. In discussing the hierarchical topology network 100, terms borrowed from graph theory including 'child', 'parent' and 'edge' are useful. The heavy lines, or in the nomenclature of graph theory, edges shown interconnecting pairs of wireless devices 102-122 in FIG. 1 represent wireless communication links. The wireless communication links can be unidirectional or bi-directional. Other wireless communication links can also potentially exist because a given wireless device may be in range of wireless devices other than those to which it is connected by an edge shown in FIG. 1. However, in routing messages according to a routing protocol that relies on the exemplary hierarchical tree topology shown in FIG. 1, the edges shown in FIG. 1 are used. The hierarchical tree topology shown in FIG. 1 is preferably used for routing messages upstream, which is to say from wireless devices 104-122 toward the root position wireless device.

According to the preferred embodiment of the invention, in addition to the wireless communication links represented by edges shown in FIG. 1, the root position wireless device 102 is able to transmit directly to any of the other wireless devices 104-122 in the network. In order for the root position wireless device to be able to transmit directly to the other wireless devices, the root position wireless devices preferably is capable of higher power transmission.

One application to which hierarchical tree topology networks are particularly suitable is sensor networks. In sensor networks that use a hierarchical tree topology network, such as shown in FIG. 1 the root position wireless device 102 ideally serves as a data sink, and the other wireless devices 104-122 are coupled to sensors (e.g., temperature sensors, smoke detectors). Information gathered by sensors is routed to the root position wireless device 102 from the other wireless devices 104-122 using the wireless communication links represented by edges shown in FIG. 1. In a sensor network, network traffic is predominantly directed to the root position wireless device 102 (as opposed to emanating from the root position wireless device).

The wireless devices 102-124 can be segregated into levels. A zeroth level includes only the root position wireless device 102. Each of the other wireless devices 104-122 is assigned to a level corresponding to the number of edges along a shortest path from the particular wireless device to the root position wireless device 102. Thus, the root position wireless device 102 has three 'children' including a second wireless device 104, a third wireless device 106, and a fourth wireless device 108 which are said to be in a first level of the network 100 because there is one edge between each of the three wireless devices 104, 106, 108 and the root position wireless device 102. The root position wireless device 102 is said to be the 'parent' of the three wireless devices 104, 106, 108 in the first level. Each of the three children 104, 106, 108 of the root wireless device 102 has three children of its own. The second wireless device 104 has three children including a fifth wireless devices 110, a sixth wireless device 112, and a seventh wireless device 114. The third wireless device 106 has three children including an eighth wireless device 116, a ninth wireless device 118, and a tenth wireless device 120. Similarly, the fourth wireless device 108 has three children including an eleventh wireless device 122, a twelfth wireless device 124, and a thirteenth wireless device 126. The fifth through thirteenth wireless devices are considered to be in a second level of the network because the shortest path between each of the fifth-through twelfth wireless devices and the root position wireless device 102 includes a sequence of two edges. In the network 100 shown in FIG. 1 there are three levels (the zeroth, first and second), and each wireless device that has children has three children. However, the number of children per device, and number of levels is merely exemplary. There can be more levels, and the number of children that devices have can vary.

In a sensor network application of the hierarchical tree topology network 100, in routing sensor data upstream to the root position wireless device 102, each of the other wireless devices 104-122 in the network need only send messages to its parent, not to its children. Thus, in a sensor network application of the hierarchical tree topology network 100 wireless communication links from children to parents are more important that wireless communication links from parents to children.

Figure 2:
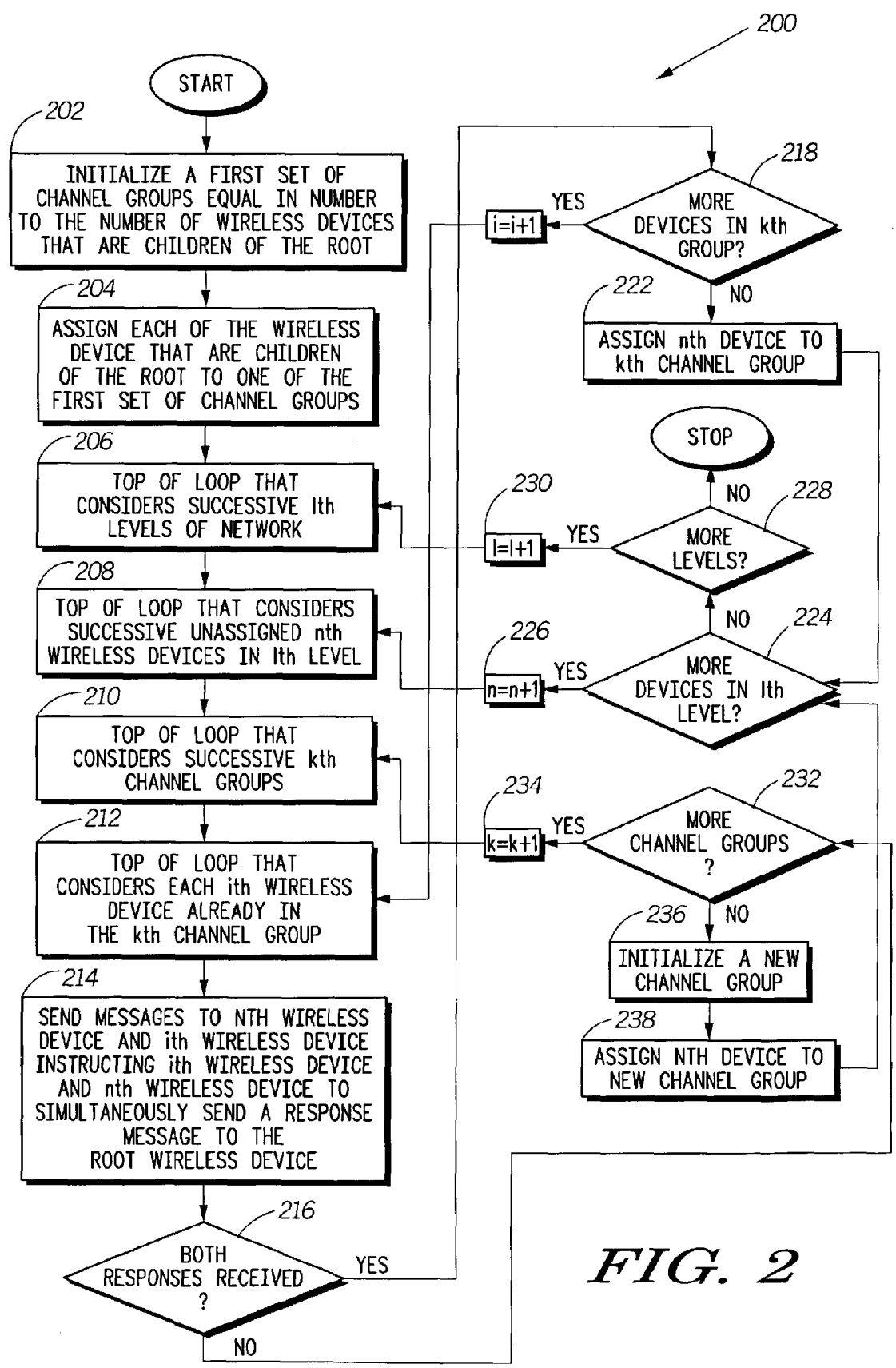
FIG. 2 is a flow chart of a method of operating a root position wireless device in order to assign channels to other wireless devices in the network shown in FIG. 1.

FIG. 2 is a flow chart of a method 200 of operating a root position wireless device e.g., 102 in order to assign channels to other wireless devices in the network shown in FIG. 1. Alternatively, the method 200 is performed by another wireless device. Although reference is made to FIG. 1 in the description of FIG. 2, the method presented in FIG. 2 is applicable to other networks. Prior to conducting the method shown in FIG. 1, a hierarchical tree topology will already have been established, and the information as to the topology will have been stored in the root position wireless device e.g., 102. One way to establish a hierarchical topology is to program each device, except for a device that is to become a root position wireless device to seek out a single parent upon powering up and only after finding a parent, to accept one or more children. The device that is to become the root position wireless device is programmed to accept one or more children upon powering up. In establishing parent child relationships, the wireless devices, e.g., 102-126 can use a rudimentary MAC such as ALOHA with double exponential back off.

Referring to FIG. 2, in step 202, a first set of channel groups that is equal in number to the number of wireless devices that are children of the root position wireless device 102 are initialized. Each channel group is assigned a particular channel. The channels assigned to the channel groups do not interfere with each other. The channels are preferably time slots in a routing protocol that uses time division multi-access. Alternatively, the channels are frequency bands, spreading codes for use in a Direct Sequence Spread Spectrum (DSSS) Code Division Multi-Access (CDMA) signaling, or frequency hop sequences for use in Frequency Hopping Spread Spectrum (FHSS) signaling, or in a hybrid system have attributes of two or more of the foregoing types of channels. In step 204 each of the wireless devices that are children of the root position wireless device 102 are assigned to one of the first set of channel groups. Thus, each of the children of the root position wireless device 102 is a first member of a channel group.

Block 206 is the top of a first (outer) program loop that considers successive levels of the network 100. The levels of the network 100 are considered sequentially starting with the children of the root position wireless device 102. The levels are pointed to by a loop index l of the first loop. Not counting the zeroth level the total number of levels in the network is denoted by capital L, which in the case of network 100 is equal to two.

Block 208 is the top of a second program loop, within the first program loop, that considers successive nth wireless devices within each lth level that have not yet been assigned to a channel group. Each wireless device is assigned to a channel group by the method 200.

Block 210 is the top of a third program loop, within the second program loop, that considers successive already established channel groups (channel groups having at least one member), for each nth wireless device that has yet to be assigned to a channel group. A loop index k of the third program loop references each already established channel group. In general, after performing the method 200, a total number (denoted capital K) of channel groups that is less than a total number (denoted capital N) of wireless devices in the network will have been assigned for use in the network e.g., 100.

Block 212 is the top of a fourth program loop, within the third program loop, that considers each ith wireless device already in a kth channel group corresponding to the current iteration of the third program loop. A loop index i of the fourth program loop points to successive wireless devices in the kth channel group.

In step 214, a message is sent by the root position wireless device 102 to the nth wireless device (corresponding to the current iteration of the second program loop) and to the ith wireless device (corresponding to the current iteration of the fourth program loop) instructing the ith wireless device and the nth wireless device to simultaneously send a response message to the root position wireless device 102 through their respective paths. In the case that the network 100 uses channel types aside from time slots, the nth, and ith wireless devices are instructed to use the same channel (e.g., frequency band, spreading code, or frequency hoping sequence). The messages including instructions that are sent in step 214 are preferably sent directly, (i.e., not routed through the network) using the high power transmit capability of the root position wireless device 102, on a separate control channel (e.g., frequency). Alternatively, the messages including instructions are routed through the network 102. By having the ith and nth wireless devices transmit simultaneously on the same channel it can be ascertained if the ith and nth devices are positioned so as to interfere with each other. If the nth and ith wireless devices are spaced apart, or there are wireless signal obstacles (e.g., metal objects, office furniture) between the ith, and nth devices, it may be possible for the ith and nth devices to use the same channel simultaneously without interfering with each other. However, in order for the nth wireless device to use the channel used by the ith wireless device, the nth device must not interfere with or be interfered with by signals from any of the wireless device in the channel group that includes the ith wireless device. Stated differently, it is not sufficient that a nth wireless device being considered for assignment to a kth channel group does not interfere with or is not interfered with by one or a subset of the members of the kth channel group, the wireless device should not interfere with any of the wireless devices in the kth channel group. The method 200 serves to group wireless devices into channel groups in a manner consistent with the foregoing criteria.

Optionally, in responding to the messages sent in block 214 the nth and ith wireless devices transmit messages using less channel coding than would ordinarily be used to transmit data, or use no channel coding at all. Reducing or eliminating the use of channel coding in testing for interference, makes the test for interference more conservative.

Block 216 is a decision block the outcome of which depends on whether both responses requested in step 214 were correctly received. Note that when a first device and a second device communicate simultaneously, it may so happen, according to the topology of the network e.g. 100, that signals from the first device interfere with communication by the second device, but signals from second device do not interfere with communication by the first device. For example in the network 100 shown in FIG. 1, consider the second 104, third 106, seventh 114 and eighth 116 wireless devices. The seventh wireless device 114 sends messages destined for the root position wireless device 102 through the second wireless device 104, and similarly, the eighth wireless device 116 sends messages destined for the root position wireless device 102 through the third wireless device 106. Note that the distance between the seventh node 114 and the third node 106 is greater than the distance between the eighth node 116 and the second node 104. The disparate distances lead to the potential, depending on: the transmit power of the seventh 114, and eighth 116 wireless devices; the placement of any signal obstacles; and the interference rejection ratio of the wireless devices of the second 104, and third 106 devices, that transmissions by the eighth device 116 will interfere with reception at the second device 104 of signals transmitted by the seventh device 114, but that transmissions by the seventh device 114 will not interfere with reception of signals transmitted by the eighth device at the third device 106.

Correct reception of both responses that were solicited in step 214 is an indication that the ith device does not interfere with the nth device, and vice versa. Information ascertained in executing blocks 214 and 216 that is information as to whether two devices interfere when using the same channel is preferably stored in a matrix termed an interference matrix. Such an interference matrix preferably includes information for plurality wireless devices in a network. Each row corresponds to a particular wireless device. Each column also corresponds to a particular wireless device. The elements of the interference matrix are binary valued. Each element of the interference matrix indicates whether or not a device specified by the column (or row) index of the element is interfered with by a device specified by the row (or column) index of the element. As indicated by parenthesis in the preceding sentence, the role of the columns and rows as corresponding to interfering or interfered with devices is alternatively reversed. Such an interference matrix, evaluated by having combinations of wireless devices in a network transmit simultaneously and determining if the transmitted messages are received, is useful in a variety of types of networks other than that shown in FIG. 1. Matrices are implemented in different programming languages, and by individual programmers in different ways. For example a matrix can be implemented as two-dimensional array, or as a list of lists.

Referring again to FIG. 2, if it is determined in block 216 that both responses solicited in step 214 were received then the possibility of assigning the nth wireless device to the kth channel group remains intact, but other member of the kth channel group, if any, remain to be checked for interference with the nth device. If both responses solicited in step 214 are received, then the method 200 continues with decision block 218 in which it is determined if there are more wireless devices in the channel group corresponding to the current iteration of the third program loop. If so, then in step 220 the loop counter i of the forth program loop which points to successive members of the kth channel group is incremented, and thereafter the method 200 loops back to block 212. If it is determined in block 218 that there are no more devices in the kth channel group, then it is concluded that the nth wireless is not interfered with, and does not interfere with wireless devices assigned to the kth channel group, and the method 200 continues with step 222 in which the nth wireless device is assigned to the kth channel group.

Thereafter, the method 200 continues with decision block 224 in which it is determined if there are more devices that have yet to be assigned to a channel group in the lth level (corresponding to the current iteration of the outer program loop). If it is determined that there are more devices that have yet to be assigned, then in step 226 the loop counter n of the second program loop, that points to successive unassigned wireless devices in the lth level is incremented, and thereafter the method 200 loops back to the top of the second program loop 208. If on the other hand it is determined in step 224 that there are no more unassigned wireless devices in the lth device, then the method 200 continues with decision block 228 in which it is determined if there are more levels in the network e.g., 100. If it is determined in decision block 228 that there are no more levels in the network, e.g., 100, the method 200 halts. If, on the other hand, it is determined in decision block 228 that there are more levels in the network e.g., 100, then in step 230 the loop counter l of the outer loop (which points to successive levels of the network, e.g., 100) is incremented and thereafter the method 200 loops back to the top of the outer program loop 206.

If on reaching decision block 216 it is determined that at least one of two responses requested in step 214 were not received correctly, then it is concluded that there is interference between the ith, and the nth wireless devices, and the method 200 continues with decision block 232 in which it is determined if there are more already established channel groups remaining that have yet to be checked as far as interference with the nth wireless device. If it is determined in decision block 232 that there are more channel groups remaining then in step 234 the loop counter k of the third program loop is incremented, and thereafter the method 200 loops back to the top of the third program loop 210 to consider another already established channel group. In considering successive channel groups for assignment of the nth device it is preferable to skip the channel group of the parent of the nth device. If, on the other hand, it is determined in decision block 232 that there are no more already established channel groups, the method continues with step 236 in which a new channel group is initialized. Thereafter in step 238 the nth wireless device is assigned to the new channel group.

Notwithstanding the fact that creation of new channel groups is, of course, limited by available bandwidth, by employing the method 200 with devices that have a transmit range that is relatively small compared to the overall spatial extent of the network (e.g., 100) in which the devices participate, devices that use the same channel are separated from each other (by distance or sometimes by wireless signal obstacles), so that a large number of devices in a network are able to use a smaller number of channels without interfering with each other. The method 200 automatically groups into channel groups, devices that are separated from each other and can use the same channel without interfering with each other.

Although not shown in FIG. 2, initialization of a new channel group in step 236 is contingent on a maximum limit channels not having been reached. Alternatively, new channel groups are obtained by reducing the effective bandwidth (e.g., time slot period length), allocated for existing channel groups and using the bandwidth saved for a new channel group.

After step 238, the method 200 loops back to decision block 224.

A hierarchical tree topology network of wireless devices having channels assigned to the wireless devices according to the method shown in FIG. 2, is especially suitable for use in conjunction with a routing protocol in which messages originating from devices other than a root position wireless device (e.g., 102) are routed toward the root position wireless device. According to such a protocol, if a messages addressed to a wireless device that is along a path in the hierarchical tree topology between an originating device and the root position wireless device, then the message need not reach the root position wireless device, only needs to go as far as the wireless device to which it is addressed. On the other hand if the destination is not along the aforementioned path the message is sent to the root position wireless device, and the root position wireless device having sufficient transmit power to reach other devices in the network directly, transmits the message to the destination directly. For the latter purpose, the root position wireless device preferably uses a channel that is distinct from channels used by other wireless devices (e.g., 104-126) in the network. Alternatively all messages are routed through the root position wireless device 104. Such routing protocols arc particularly appropriate because channels are assigned by the method shown in FIG. 2 so that wireless devices do not interfere, when transmitting messages through their respective parents to the root position wireless device 102.

Figure 3:
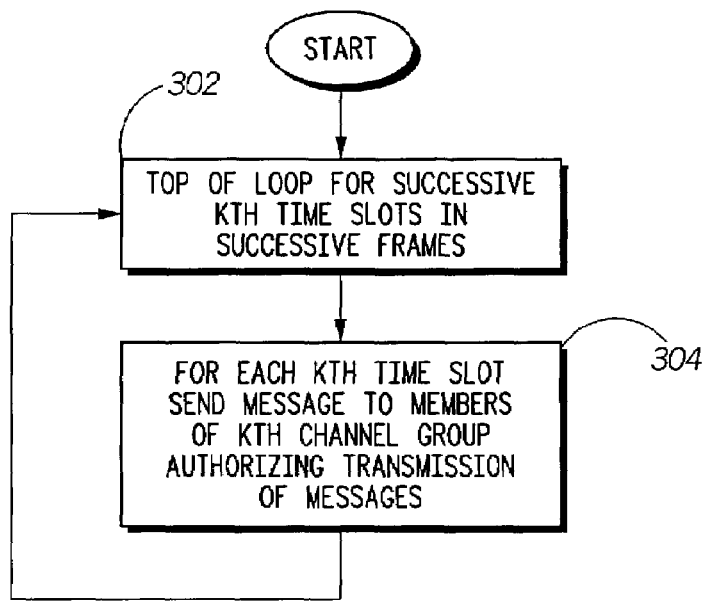
FIG. 3 is a flow chart of a method of operating the root position wireless device shown in FIG. 1 in order to coordinate communications in the network.

FIG. 3 is a flow chart of a method of operating the root position wireless device shown in FIG. 1 in order to coordinate communications in the network. Block 302 is the top of a loop that considers successive times slots in successive frame periods. In step 304, for each timeslot a message is sent to wireless devices of the kth channel group authorizing the wireless devices in the kth channel group to transmit any messages that each wireless device in the kth channel group might have to transmit. The method shown in FIG. 3 represents a group polling MAC method. The success of the group polling MAC method shown in FIG. 3 depends on the wireless devices in the network (e.g., 100) having been assigned by the method shown in FIG. 2 to channel groups in which they do not interfere with other members. In the case that each channel is a time slot of TDMA multi-access protocol, each channel group can be termed a polling group.

According to an alternative embodiment the wireless devices 104-126 have internal clocks that are synchronized and are able to determine when it is their turn to transmit without having to receive a poling signal. In such an alternative, the wireless devices are optionally maintained in synchronism by synchronization signals that are sent from time to time by the root position wireless device 102.

Figure 4:
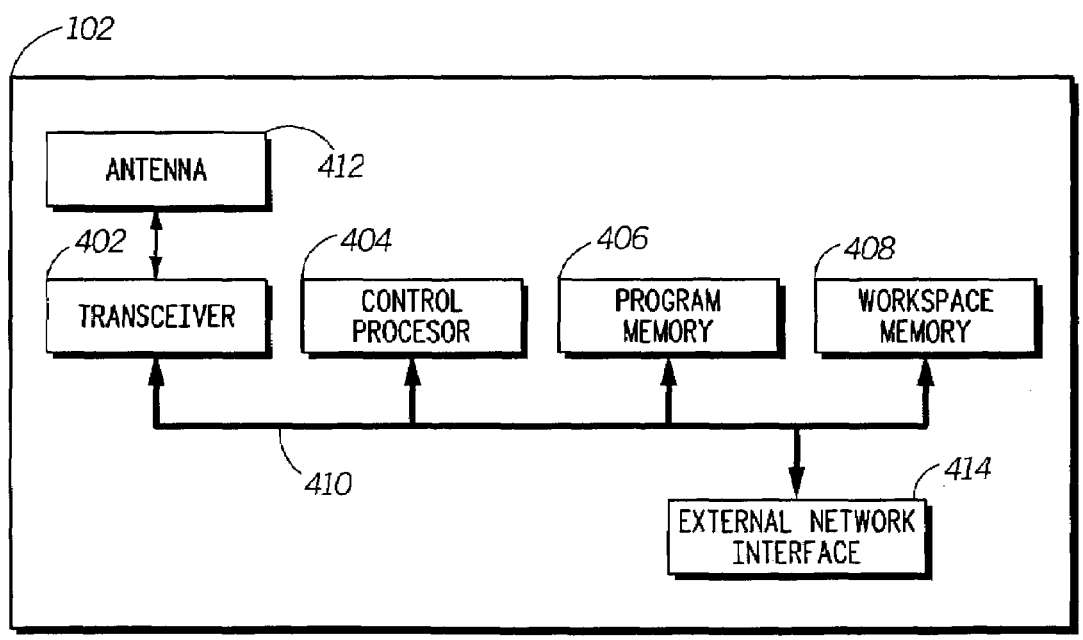
FIG. 4 is a hardware block diagram of a root position wireless device that is included in the network shown in FIG. 1 according to the preferred embodiment of the invention.

FIG. 4 is a hardware block diagram of the root position wireless device 102 that is included in the network shown in FIG. 1 according to the preferred embodiment of the invention. Optionally the wireless devices (e.g., root position wireless device 102) that in carrying out certain routing protocols perform more functions (e.g., control functions) are connected to external power sources, and/or have higher processing power. The root position wireless device 102 comprises a transceiver 402 a processor 404, a program memory 406, a work space memory 408, and an external network interface coupled together through a signal bus 410. The control processor 404 controls the overall operation of the wireless device 102, and is used to execute programs embodying the methods shown in FIGS. 2-3. The control processor 404 also serves to generate packets for transmission, and process received packets. The program memory 406 is used to store the programs executed by the control processor 404. The program memory 406 is a type of computer readable medium. Programs embodying the method shown in FIGS. 1-2 are alternatively stored in other types of program memories. The works space memory 408 is used as a workspace by the control processor 404 in executing the programs stored in the program memory 606. The transceiver 402 is coupled to an antenna 412. The external network interface is used to couple the root position wireless device 102 to an external network such as a local area network (LAN) or other external network. The other wireless devices 104-126 preferably have the same basic internal structure, but do not need the external network interface 414.

Although a particular flow chart is presented in FIGS. 2,3, it is to be understood that the structure of programs embodying the teachings of the present invention will vary depending on the programming language used, and programming style.

The computer readable medium used in connection with the present invention as a memory for storing programs can comprise volatile memory such as RAM, or a medium that contains data in a transient state, such as a communication channel, network circuits, or a wireless communication link, or preferably nonvolatile memory including but not limited to, flash memory, Read Only Memory (ROM), EPROM, EEPROM, disk drive. The computer readable medium used as a work space for signal processing operations, can comprise Random Access Memory (RAM).

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A wireless network comprising:
a number N of wireless devices in a hierarchical tree routing topology for upstream data transmission the number of wireless devices including a root position wireless device at a root position of the hierarchical tree topology, wherein at least each of the plurality of wireless devices except for the root position wireless device, has a parent node;
each nth wireless device among the plurality of wireless devices, except for the root position wireless device and wireless devices that are in positions of children of the root position, routes messages to the root wireless device through a parent wireless device of the nth wireless device;
the number of wireless devices together conduct communication on a number K of channels that is less than the number N of wireless devices, wherein each kth channel among the number K of channels is assigned to a kth channel group that includes a subset of the number N of wireless devices, wherein the wireless devices of each kth channel group are positioned such that any two wireless devices of each kth channel group do not interfere with each other when simultaneously transmitting on the kth channel to respective parents of the two wireless devices.

2. The wireless network according to claim 1 wherein:
the root position wireless device has sufficient transmit power to transmit directly to substantially all of the number N of wireless devices.

3. The wireless network according to claim 1 wherein:
the number K of channels comprise the number K of time slots of a time division multi-access scheme.

4. The wireless network according to claim 1 wherein:
the number K of channels comprise the number K of spreading codes of a code division multi-access scheme.

5. The wireless network according to claim 1 wherein:
the number K of channels comprise the number K of frequency hopping sequences of a frequency hopping spread spectrum multi-access scheme.

6. The wireless network according to claim 1 wherein:
the number K of channels comprise the number K of frequency bands of a frequency division multi-access scheme.

7. The wireless network according to claim 1 wherein:
the number K of channels comprise two or more attributes selected from the group consisting of: a frequency, a frequency hop sequence, a direct sequence spread spectrum spreading code, and a time slot.

8. A method of allocating channels to wireless devices in a hierarchical tree topology routing network, the method comprising:
assigning each of a first set of one or more channels to one of a first group wireless devices, so that that each of the first group of wireless devices is assigned one channel from the first set of one or more channels;
for each ith wireless device, among one or more remaining wireless devices in the network, that has yet to be assigned a channel, and for successive jth channels, among one or more channels already assigned in the network, testing if communication by the ith wireless device on the jth channel interferes with or is interfered with, by communication by other wireless devices in the network already assigned to use the jth channel; and
in the case that communication by the ith wireless device on the jth channel is not interfered with and does not interfere with communication by wireless devices using the jth channel, assigning the jth channel to the ith wireless device;
in the case that communication by the ith wireless device interferes with or is interfered with by communication on each channel among the one or more channels already assigned in the network, and more channels remained to be allocated for use in the network, allocating a new channel to the ith wireless device.

9. The method of allocating channels in a hierarchical tree topology routing network according to claim 8 wherein:
assigning each of the first set of one or more channels to one of the first group of wireless devices comprises:
assigning each of the first set of one or more channels to a set of wireless devices that occupy positions of children of a root position wireless device of the hierarchical tree topology network; and
wherein the method assigns channels starting with the set of wireless devices that occupy positions of children of the root position wireless device and working down level-by-level in the hierarchical tree topology.

10. The method according to claim 8 wherein testing if communication by the ith wireless device on the jth channel interferes with or is interfered with, by communication by wireless devices in the network already assigned to use the jth channel comprises:
transmitting one or more messages from the ith device and transmitting a message from each wireless device using the jth channel and determining if the messages transmitted by the ith devices and each other wireless device using the jth channel are received correctly.

11. The method according to claim 10 wherein:
transmitting one or more messages from the ith device and transmitting a message from each wireless device using the jth channel comprise transmitting messages using less channel coding than is used for data transmission in the network.

12. The method according to claim 10 wherein, in testing if communication by the ith wireless device on the jth channel interferes with or is interfered with, by communication by wireless devices in the network using the jth channel:

each wireless device using the jth channel transmits concurrently with the ith device but separately from other wireless devices using the jth channel.

13. The method of allocating channels in a hierarchical tree topology network according to claim 10 wherein:

assigning each of the first set of one or more channels to one of the first group of wireless devices comprises:
assigning each of the first set of one or more channels to a set of wireless devices that occupy positions of children of a root position wireless device of the hierarchical tree topology network; and
wherein the method assigns channels starting with the set of wireless devices that occupy positions of children of the root position wireless device and working down level by level in the hierarchical tree topology.

14. The method according to claim 13 wherein:

transmitting one or more messages from the ith wireless device comprises:

transmitting one or more message destined for the root position wireless device through a parent of the ith wireless device;

transmitting a message from each wireless device using the jth channel comprises:

transmitting a message destined for the root position wireless device from each wireless device using the jth channel, through a respective parent of each wireless device using the jth channel; and determining if the messages transmitted by the ith devices and each other wireless device already assigned to the jth channel are correctly received comprises:

determining if the messages transmitted by the ith devices and each other wireless device using the jth channel are correctly received at the root position wireless device.

15. The media access control method according to claim 14 wherein:

the wireless devices in each polling group are positioned so as not to interfere with each other, in respect to messages sent to parents of the members of the polling group.

* * * * *